United States Patent [19]
Grubb

[11] 3,772,175
[45] Nov. 13, 1973

[54] UNIVALENT CATION-SELECTIVE ELECTRODE

[75] Inventor: Willard T. Grubb, Schenectady, N.Y.

[73] Assignee: General Electric Company, Schenectady, N.Y.

[22] Filed: June 28, 1971

[21] Appl. No.: 157,166

[52] U.S. Cl............................................ 204/195 M
[51] Int. Cl. .......................................... G01n 27/46
[58] Field of Search...................... 136/86 D, 86 DD, 136/120 FC; 204/1 T, 195 M

[56] References Cited
FOREIGN PATENTS OR APPLICATIONS
1,402,343   5/1965   France ........................... 204/195 M OTHER PUBLICATIONS
"Analytical Chemistry," Nov. 1967, pp. 28a–45a.

Primary Examiner—T. Tung
Attorney—John F. Ahern et al.

[57] ABSTRACT

A univalent cation-selective electrode has an open ended non-ion-selective tube, an ion-selective disc sealed to one open end of the tube, the disc consisting of partially cured silicone rubber containing concentrated ammonium hydroxide, or partially cured, silica-filled silicone rubber containing concentrated ammonium hydroxide, a reference electrode such as a silver wire with a silver chloride portion positioned within the tube, a reference electrolyte such as a metallic chloride solution within the tube and in contact with the silver chloride portion of the silver wire, a closure over the opposite end of the tube with an aperture therein, and a portion of the silver wire extending through the aperture in the closure to the exterior of the tube.

6 Claims, 1 Drawing Figure

Patented Nov. 13, 1973
3,772,175
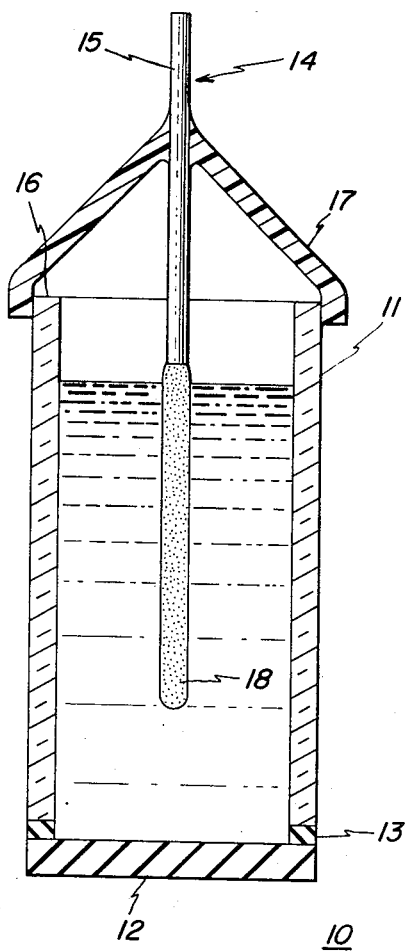
INVENTOR:
WILLARD T. GRUBB
by Paul R. Webb II
HIS ATTORNEY

UNIVALENT CATION-SELECTIVE ELECTRODE

This invention relates to cation ion-selective electrodes and, more particularly, to such cation ion-selective electrodes employing a univalent cation-selective disc of modified silicone rubber.

In electrochemical measurements, a reference electrode is employed with a measuring or sensing electrode, such as a glass electrode, with both electrodes immersed in a solution, whereby the potential difference between the two electrodes is a function of the concentration of an ion in the solution.

My present invention is directed to an improved univalent cation-selective electrode which is suitable for biomedical environmental control and other applications.

The primary object of my invention is to provide a rugged and dependable cation-selective electrode employing a disc of univalent cation-selective material.

In accordance with one aspect of my invention, a univalent cation-selective electrode comprises a tube of non-ion-selective material having opposite open ends, an ion-selective material sealed to the first open end, the material consisting of partially cured, silica-filled silicone rubber treated with concentrated ammonium hydroxide, a reference electrode such as a silver wire with a silver chloride portion positioned within the tube at the second end thereof, a reference electrolyte, such as a metallic chloride solution within the tube and in contact with the silver chloride portion of the silver wire, a closure over the opposite end of the tube with an aperture therein, and a portion of the silver wire extending through the aperture in the closure to the exterior of the tube.

These and various other objects, features and advantages of the invention will be better understood from the following description taken in connection with the accompanying drawing in which:

The single FIGURE is a sectional view of an ion-selective electrode made in accordance with my invention.

In the single FIGURE of the drawing there is shown generally at 10 a univalent cation-selective electrode made in accordance with my invention. A tube 11 of non-ion-selective material, such as glass has a disc 12 of univalent cation-selective material of modified silicone rubber sealed to one open end of glass tube 11 by a room temperature sealant 13, such as, a room temperature silicone rubber sealant. A reference electrode 14 with a silver wire portion 15 is positioned partially within tube 11 at an end 16 and extends outwardly from end 16. Tube 11 is sealed at end 16 to electrode 14 using a polymeric shrink tube closure 17. At least a portion of wire 15 within tube 11 has a coating 18 of silver chloride thereon.

I found that suitable non-ion-selective tubular materials include glass tube, polymethylmethacrylate tube, and heat shrinkable polyolefin tube. The univalent cation-selective material is a partially cured silicone rubber treated with concentrated ammonium hydroxide. The univalent cation-selective disc is sealed to one open end of the non-ion-selective material tube by various room temperature sealants. I prefer RTV silicone rubber as the sealant. The preferred reference electrolyte solution within the non-ion-selective material tube is a potassium chloride solution. However, other suitable metallic chloride solutions include ammonium chloride, NaCl, $MgCl_2$, etc.

I found that the ion-selective material of my invention can be formed by a unique method in which partially cured silicone rubber is soaked preferably at room temperature in concentrated aqueous ammonium hydroxide solution for a relatively short time, for example, 30 minutes for a 0.003 inch thick film. The material exhibited a cation permeability, particularly toward $K^+$ and $NH_4^+$ ions. While various types of partially cured silicone rubbers are suitable in the practice of my invention, I found such a rubber, which was mainly a dimethyl siloxane polymer filled with 44 percent by weight of fumed silica filler. Such a rubber film of about 0.003 inch thickness formed by my method exhibited a resistivity of $1 \times 10^7$ ohm·cm as opposed to a resistivity of $9 \times 10^8$ ohm·cm before ammonia treatment. Per decade of cation concentration difference, the potentials were from about 45 to 59 millivolts for univalent cations.

In an illustrative operation of my electrode, the electrode is assembled as above-described using a 0.1 molar potassium chloride internal solution. An associated reference electrode is placed in a solution into which is placed the univalent cation-selective electrode. The potential difference between the two electrodes is a function of the concentration of the ammonium ion in the solution.

Examples of univalent cation-selective electrodes in accordance with my invention are set forth below:

EXAMPLE I

A non-ion-selective glass tube with opposite open ends had sealed on one end thereof, a disc of partially cured silicone rubber by means of RTV silicone rubber. After the seal had been allowed to cure for 24 hours, the silicone film was soaked in concentrated ammonium hydroxide followed by careful rinsing in distilled water. The tube was filled with a 0.1 molar solution of potassium chloride. A silver wire with a chlorided silver portion was positioned within the tube in contact with the solution and extended out from the opposite open end of the tube. The tube was sealed to the wire by heating a polyolefin shrink tube over one end of the tube having a part of the silver wire exposed. This structure resulted in a univalent cation-selective electrode for measuring potassium ion activity.

EXAMPLE II

The electrode formed above in Example I was tested in a series of potassium chloride solutions. Its voltage against a silver/silver chloride 3N KCl salt bridge reference electrode was as follows:

| Concentration of: | | | | | | |
|---|---|---|---|---|---|---|
| Concentration of: KCl (moles/liter)... | $10^{-5}$ | $10^{-4}$ | $10^{-3}$ | $10^{-2}$ | $10^{-1}$ | 1 |
| EMF in millivolts... | −79 | −54 | −5 | +50 | +103 | +148 |

This electrode senses potassium ions with a voltage change of 45 to 55 millivolts per decade change of potassium ion concentration in the range from 1 to $10^{-4}$ moles/liter.

EXAMPLE III

A non-ion-selective polymethylmethacrylate tube with opposite open ends had sealed with a flange seal on one end thereof a disc of partially cured silicone rubber that had been treated with concentrated ammonium hydroxide for one hour followed by rinsing. The tube was filled with a 1.0 molar solution of ammonium chloride. A commercial calomel reference was positioned within the tube in contact with the solution and extended out from the opposite initially opened end of the tube through an aperture. This structure resulted in a univalent cation-selective electrode for measuring ammonium ion activity.

EXAMPLE IV

The electrode formed above in Example III was tested in a series of ammonium chloride solutions. Its voltage against an external saturated calomel reference electrode was as follows:

| Concentration of NH$_4$Cl (moles/liter) | $10^{-4}$ | $10^{-3}$ | $10^{-2}$ | $10^{-1}$ | 1 |
|---|---|---|---|---|---|
| EMF in millivolts | 207 | 157 | 98 | 47 | 0 |

This electrode senses ammonium ions with a voltage change of 47 to 59 millivolts per decade change in ammonium ion concentration from $10^{-4}$ to 1.0 moles/liter.

EXAMPLE V

A non-ion-selective glass tube with opposite open ends had sealed on one end thereof, by means of an RTV silicone sealant a disc of partially cured silicone rubber treated with concentrated ammonium hydroxide for 30 minutes and rinsed in distilled water. After the seal had been allowed to cure for 24 hours, the tube was filled with a 0.1 molar solution of potassium chloride. A silver wire with a chlorided silver portion was positioned within the tube in contact with the solution and extended out from the opposite initially opened end of the tube through an aperture in the tube which was shrunken on that end. This structure resulted in an ion-selective electrode for measuring sodium ion activity.

EXAMPLE VI

The electrode of Example V was tested in a series of sodium chloride solutions. Its voltage against a silver/silver chloride 3N KCl salt bridge reference electrode was as follows:

| Concentration of NaCl (moles/liter) | $10^{-4}$ | $10^{-3}$ | $10^{-2}$ | $10^{-1}$ | 1 |
|---|---|---|---|---|---|
| EMF in millivolts | −77 | −37 | +15 | +65 | +108 |

This electrode senses sodium ions with a voltage change of 40 to 52 millivolts per decade change in sodium ion concentration from $10^{-4}$ to 1 moles per liter.

While other modifications of the invention and variations thereof which may be employed within the scope of the invention have not been described, the invention is intended to include such as may be embraced within the following claims:

What I claim as new and desire to secure by Letters Patent of the United States is:

1. A univalent cation-selective electrode comprises a tube of a non-ion selective material having opposite open ends, an ion-selective material sealed to the first open end consisting of partially cured silicone rubber containing ammonium hydroxide, a reference electrode positioned partially within the tube at the second end thereof and extending outwardly from the second end, and a reference electrolyte solution filling the tube and in contact with the reference electrode, a closure over the opposite end of the tube with an aperture therein, and a portion of the reference electrode extending through the aperture in the closure to the exterior of the tube.

2. A univalent cation-selective electrode as in claim 1, in which the partially cured silicone rubber containing ammonium hydroxide is filled with silica.

3. A univalent cation-selective electrode as in claim 2, in which the tube is non-ion-selective glass, the reference electrolyte solution is potassium chloride, and the partially cured silicone rubber containing ammonium hydroxide is filled with silica in a ratio of 100 parts of silicone rubber to 44 parts silica by weight.

4. A univalent cation-selective electrode as in claim 1, in which the tube is non-ion-selective glass.

5. A univalent cation-selective electrode as in claim 1, in which the tube is a polymethylmethacrylate polymer.

6. A univalent cation-selective electrode as in claim 1, in which the reference electrode is a silver wire with a silver chloride portion, and the reference electrolyte solution is a metallic chloride solution.

* * * * *